TRANSDUCING METHOD AND APPARATUS

Filed Dec. 11, 1963 2 Sheets-Sheet 1

INVENTORS
HANS JAFFE
DON A. BERLINCOURT

James A. Smith
ATTORNEY

TRANSDUCING METHOD AND APPARATUS

Filed Dec. 11, 1963 2 Sheets-Sheet 2

INVENTORS
HANS JAFFE
DON A. BERLINCOURT

James A. Smith
ATTORNEY

United States Patent Office 3,354,425

Patented Nov. 21, 1967

3,354,425
TRANSDUCING METHOD AND APPARATUS

Hans Jaffe, Cleveland Heights, and Don A. Berlincourt, Chagrin Falls, Ohio., assignors to Clevite Corporation, a corporation of Ohio Filed Dec. 11, 1963, Ser. No. 329,721
4 Claims. (Cl. 340—10)

This invention relates to electrical to mechanical energy conversion and, particularly, to an improved method and transducing device for converting a hydrostatic pressure to an electric signal or vice versa.

More specifically, the invention pertains to a transducing method and transducing device utilizing a piezoelectric crystal exhibiting a hydrostatic piezoelectric effect. By the term "hydrostatic piezoelectric effect" is meant the coupling between a pressure applied uniformly to all sides of a piezoelectric crystal body and an electric field created by this pressure in a certain direction in the crystal which is variously called the electric axis, the polar direction, or polar axis. The effect is reversible as the hydrostatic crystal, upon being ssubjected to an electric field parallel to the polar axis, is subject to a change in volume which can be communicated to a surrounding fluid medium in the form of acoustic waves. Piezoelectric effects due to hydrostatic pressure are mentioned at page 194 in the book "Piezoelectricity" by Walter G. Cady, published by the McGraw-Hill Book Company in 1946.

The invention possesses particular utility in connection with an underwater transducer such as utilized in sonar equipment. It will be apparent to those skilled in the art, however, that the invention is not limited to this specific application and that many other applications are possible.

In the past, underwater transducers have been fabricated to utilize a hydrostatic piezoelectric effect or a one-dimensional piezoelectric effect. A one-dimensional piezoelectric effect is in many cases less desirable in that a costly supporting and shielding means must be utilized to derive a one- or two-dimensional stress from the hydrostatic pressure. On the other hand, when a hydrostatic piezoelectric effect is utilized, the transducer element may in effect be merely electrically insulated and suspended in the underwater environment by a suitable cable containing the electrical lead wires for the transducer. Thus the hydrostatic piezoelectric effect is particularly useful in an underwater transducer because of the basic structural simplicity of the transducer.

A hydrostatic piezoelectric effect is permitted by symmetry in many crystals and particularly in ferroelectrics. In most substances, however, the hydrostatic piezoelectric effect is relatively weak as the effect of pressure in the electric field direction is largely compensated by an opposite effect of pressure perpendicular to the electric field direction. This is the case for widely used barium titanate and lead zirconate-lead titanate ceramics. Thus, few piezoelectric materials possess a significant response to hydrostatic pressure.

The preferred figure of merit for hydrostatic piezoelectric transducer materials is the product of the hydrostatic piezoelectric strain constant $d_h$ and the piezoelectric voltage constant $g_h$. A definition of these constants is found in the Institute of Radio Engineers Standards on Piezoelectric Crystals, 61 IRE 14. SR1, published in 1961.

The product $g_h \times d_h$ is a direct measure of the electric energy that can be extracted per unit volume of piezoelectric material for a given level of hydrostatic pressure. Lithium sulfate, heretofore thought to be the most strongly hydrostatic piezoelectric crystal, has a $d_h \times g_h$ product at room temperature of $2.3 \times 10^{-12}$ meter $^2$/newton and a dielectric constant of 10.3. Lead metaniobate ceramic material, having relative high hydrostatic response compared to other piezoelectric ceramics, has a dielectric constant of about 250 and a $d_h \times g_h$ product of likewise about $2 \times 10^{-12}$ meter $^2$/newton.

Aside from the relatively weak hydrostatic piezoelectric effects possessed by prior art underwater transducers, another general limitation is the relatively low dielectric constants possessed by many transducers. When the transducer is positioned at a substantial ocean depth the large lead wire capacitance shunting the relatively low capacitance of the transducer results in a substantial energy loss. In some instances this has necessitated the use of a cathode follower amplifier located in proximity to the transducer to establish a high transducer impedance so that the output signal thereof is not degraded by the lead wire capacitance.

It is a principal objection of the present invention to provide a transducer having a hydrostatic piezoelectric effect markedly superior to prior art hydrostatic transducers.

Another object of the invention is to provide an improved underwater piezoelectric transducer.

Another object of the invention is to provide a transducer having a hydrostatic piezoelectric effect of high magnitude over a substantial temperature range.

Another object of the invention is to provide an underwater transducer having a hydrostatic piezoelectric effect of large magnitude and a high dielectric constant.

Another object of the invention is to provide an improved method of converting hydrostatic pressure to electric energy or vice versa.

The invention is based generally on the discovery of a strong hydrostatic piezoelectric effect in a Group V–VI–VII family of compounds. Representative of these compounds is the compound SbSI which has a hydrostatic piezoelectric modulus $d_h$ of over $10^{-9}$ coulombs per newton, a dielectric constant of approximately 2100 at 0° C. and a $d_h g_h$ value at 0° C. of $54 \times 10^{-12}$ m.$^2$/$n$. In accordance with the invention a preferred embodiment of an underwater transducer includes a piezoelectric element comprising the compound SbSI and electrodes attached to opposite surfaces of the element.

Other objects and advantages will become apparent from the following description taken in connection with the accompanying drawing wherein.

Crystalline compounds suitable for practice of the invention are certain ferroelectric compounds in V–VI–VII group of compounds having a mmm. crystal symmetry (orthorhombic with a center of symmetry) above their Curie point, and having a 2 mm. crystal symmetry (orthorhombic with the polar axis the two-fold axis) below the Curie point. Above the Curie point compounds in this group are paraelectric. Below the Curie point they are characteristically ferroelectric. The ferroelectric properties of the representative compound SbSI are reported in the publication "Ferroelectricity in SbSI," E. Fatuzzo et al., Physical Review 127, 2036 (1962).

We have discovered that SbSI, which may be considered characteristic of compounds in the Group V–VI–

VII family having the aforementioned crystal structure, possesses an exceptional hydrostatic piezoelectric effect below the Curie temperature and possess a high dielectric constant which renders it particularly suitable for underwater transducing applications. Ferroelectric compounds known to possess the described crystal structure are Group V–VI–VII compounds having the type formula XYZ where X is an element selected from the group comprising antimony and bismuth, Y is an element selected from the group comprising sulfur, selenium and tellurium and Z is an element selected from the group comprising iodine, chlorine and bromine. It will be apparent that each of the constituents X, Y and Z may comprise a mixture of the elements within the stated groups. It will also be apparent that numerous Group V–VI–VII compounds can be formulated possessing the desired crystal structure. These may be a single crystal, bundles of oriented crystals or polycrystalline ceramics. The following is a table listing a few of the many Group V–VI–VII compounds known to possess the described crystal structure of which the compound SbSI is representative.

| Compound: | Composition |
|---|---|
| 1 | SbSI |
| 2 | SbSBr |
| 3 | SbSeBr |
| 4 | SbSeI |
| 5 | SbTeI |
| 6 | BiSCl |
| 7 | BiSBr |
| 8 | BiSI |
| 9 | BiSeCl |
| 10 | BiSeBr |
| 11 | BiSeI |

The preferred composition for practice of the invention is the composition SbSI which has a Curie temperature of 22° C. The needle growth habit of SbSI is characteristic of Group V–VI–VII compounds and is specifically disclosed in the publication: "Photoconduction in Ternary V–VI–VII Compounds," R. Nitsche and W. J. Merz, J. Phys. Chem. Solids 13, 154 (1960).

Figure 1:
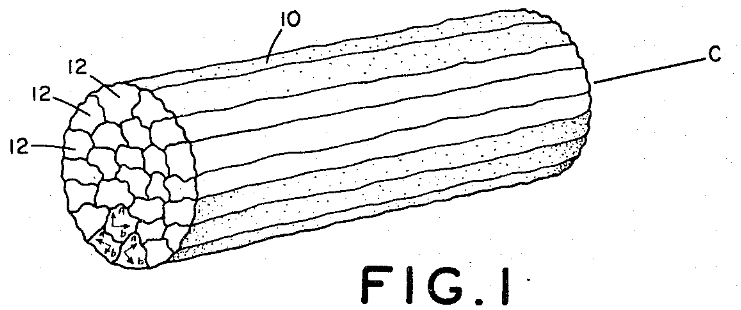
FIGURE 1 is a perspective view of a grown crystalline structure comprising a Group V–VI–VII compound.

Referring to FIGURE 1 of the drawings there is shown a crystalline mass 10 of SbSI material which may be grown by the method disclosed in the aforementioned publication. More specifically, SbSI can be grown in a very thin needle-like single crystalline structure (the longitudinal needle axis being the ferroelectric axis) or can be grown in a multicrystalline tubular structure 10 as shown in FIGURE 1 comprising a bundled mass of single crystalline needles 12. The needles 12 have parallel aligned ferroelectric *c* axes but randomly oriented *a* and *b* axes as shown in FIGURE 1. Thus the ferroelectric axis *c* of every crystal in the bundle 10 is along the longitudinal axis thereof as depicted in FIGURE 1. It is known that such bundled masses may be easily grown to lengths of 10 cm. with a diameter of about 5–7 mm.

Figure 2:
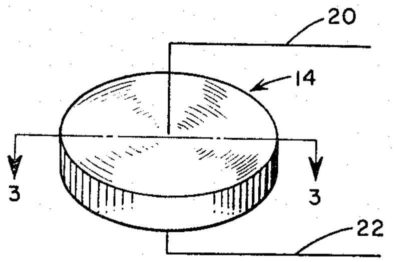
FIGURE 2 is a perspective view of an underwater transducer embodying the invention.
Figure 3:
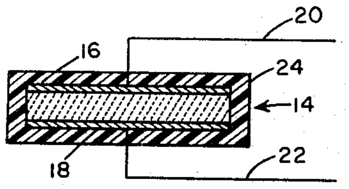
FIGURE 3 is a section taken along the line 3—3 of FIGURE 2.

The grown cylindrical structure 10 depicted in FIGURE 1 may be cut or sliced perpendicular to its longitudinal or ferroelectric axis to produce a disc 14 of the configuration shown in FIGURES 2 and 3. Electrodes 16 and 18 may be suitably formed on the opposite face surface of the disc 14 as by a suitable metal evaporation process or by application of an electrically conductive paint. Lead wires 20 and 22 may be suitable connected to electrodes 16 and 18 to provide for circuit connection of the transducer disc 14. To impart rigidity to the transducer disc 14 the electroded assembly may be suitably encapsulated and rendered waterproof by a layer 24 of suitable plastic material such as an epoxy resin.

The transducer disc 14 may be suitably polarized by connecting a voltage source of predetermined magnitude across electrodes 16 and 18. In the case of SbSI a voltage source sufficient to produce an electric field of 0.5 to 2 kv./cm. is sufficient to render the disc 14 piezoelectric below the Curie point (22° C.). It will be apparent that the Curie point and also the magnitude of the required polarizing field will vary with Group V–VI–VII compositions other than SbSI.

If a hydrostatic piezoelectric crystal body such as transducer disc 14 is subjected to uniform hydrostatic pressure on all of its surfaces, no shearing stresses will be introduced into the crystal body. In the case of the crystal structure possessed by SbSI and the related isostructural compounds listed above, the piezoelectric moduli effective to determine the hydrostatic modulus are $d_{31}$, $d_{32}$ and $d_{33}$ if the polar axis (*c* axis) is chosen as the Z coordinate axis in accordance with the nomenclature recommended by the Committee on Piezoelectricity of the Institute of Radio Engineers for the 2 mm. polar crystal class. If the piezoelectric moduli $d_{31}$, $d_{32}$ and $d_{33}$ do not cancel each other, there is a resultant polarization in the direction of the polar axis which is termed the hydrostatic piezoelectric modulus.

The piezoelectric modulus $d_{33}$ describes the strain (relative elongation parallel to the Z axis) produced by a unit electric field applied in the same direction. The moduli $d_{32}$ and $d_{31}$ indicate the strain parallel to the *b* and *a* axes, respectively, produced by the unit electric field parallel to the Z axis. The same piezoelectric moduli are applicable to the direct piezoelectric effect where they describe the charge per unit surface area produced by a unit stress.

With respect to the crystal structure of SbSI and related isostructural compounds the hydrostatic modulus $d_h$ may be expressed as follows in terms of the moduli $d_{31}$, $d_{32}$ and $d_{33}$:

$$d_h = d_{33} + d_{31} + d_{32}$$

Figure 5:
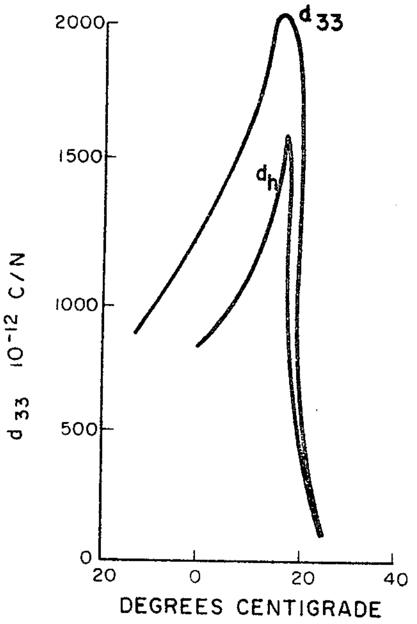

In FIGURE 5 we have illustrated the magnitude of the $d_h$ and $d_{33}$ moduli over a substantial temperature range below the Curie point. The piezoelectric modulus $d_{33}$ was measured directly using a 100 c.p.s. force parallel to the *c* axis and by collecting the electric charge on a large capacitance. The hydrostatic piezoelectric modulus $d_h$ was measured using a calibrated 60 c.p.s. hydrostatic pressure of about $4 \times 10^4$ n./m.$^2$ and collecting the charge on a large capacitance.

Considering the curves of FIGURE 5 it will be noted that the modulus $d_h$ is only slightly less than the modulus $d_{33}$ in magnitude. Accordingly it is believed that the moduli $d_{31}$ and $d_{32}$ are relatively small or of opposite sign accounting for the large magnitude of $d_h$.

Figure 7:
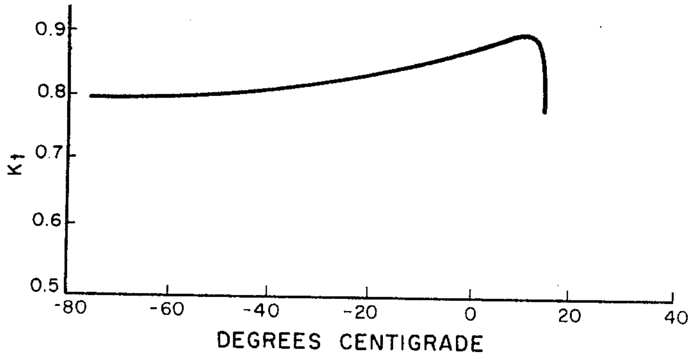
FIGURES 5, 6 and 7 are curves illustrating the piezoelectric characteristics of a transducer embodying the invention.

FIGURE 7 of the drawings illustrates the piezoelectric coupling factor $k_t$ associated with a high frequency thickness mode with motion parallel to the polar axis which extends coaxially through disc 14. In this case the disc 14 was under lateral constraint.

Figure 6:
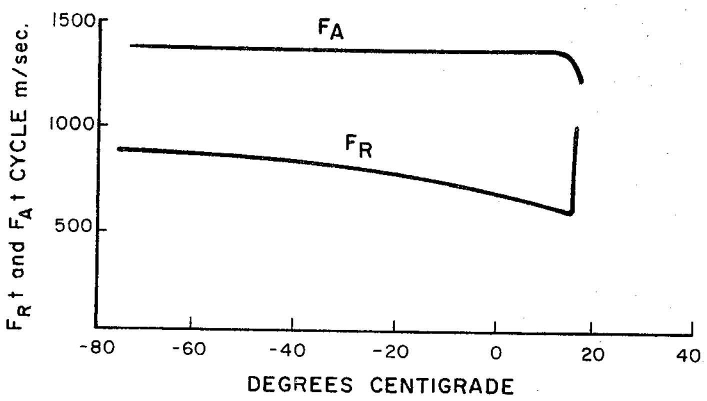

FIGURE 6 of the drawings illustrates the characteristic resonant frequency ($f_R$) and the antiresonant frequency ($f_A$) of a transducer disc 14 measured with temperature rising. As will be apparent from FIGURE 7 the transducer exhibited very slight frequency variations with temperature and thus possesses good inherent temperature stability.

The compound SbSI possesses the strongest hydrostatic piezoelectric effect known and the highest usable dielectric constant of any known piezoelectric material. These characteristics coupled with the inherent frequency stability and operation over a wide temperature range render the transducer 14 markedly superior to prior art underwater transducers.

The other possible isomorphic Group V–VI–VII compounds hereinbefore disclosed by reason of their identical crystalline structure and growth habits will possess similar piezoelectric characteristics. It will also be apparent that while the disclosed data was obtained on a polarized body consisting of many individual crystals having substantially parallel *c*-axes, similar favorable results would be obtained with an extended single crystal body of said compounds. Moderately lower, but still useful hydrostatic piezoelectric response will be obtained from a ceramic-like body of compounds in which the individual crystals are initially of random orientation but acquire a preferred polarity sense of their *c*-axes by the electric polarizing process.

The preferred composition SbSI has a known Curie point of 22° C. which in many geographical locations is below ambient air temperature at sea level. Water temperatures at any significant depth are lower than 22° C. and at depths where sonar equipment is operated are as low as 0° C. Accordingly, the crystalline SbSI material will be ferroelectric at temperatures encountered below the ocean surface even though in some geographical locations it may be paraelectric in air.

Figure 4:
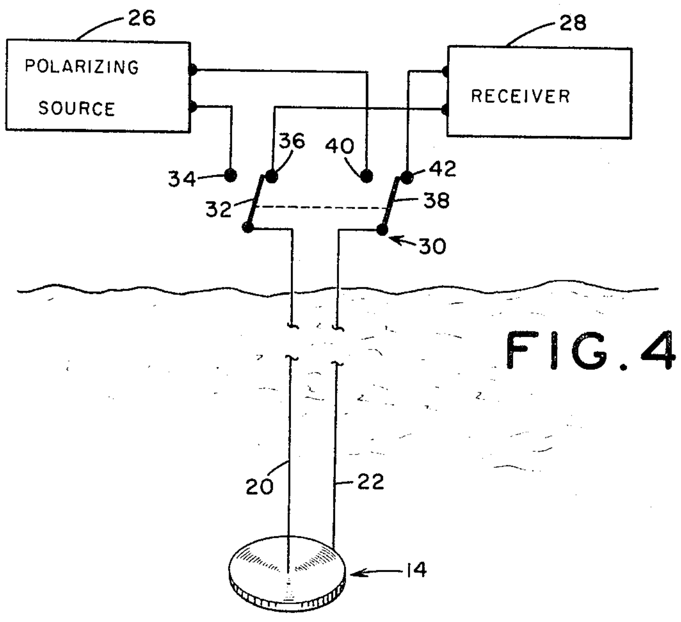
FIGURE 4 is a schematic circuit diagram illustrating an application of the transducer of FIGURE 2.

In FIGURE 4 of the drawings we have illustrated schematically a circuit for polarizing and operating the transducer 14 at an underwater location. Specifically there is shown a polarizing voltage source 26 and an electric receiver 28 adapted to be selectively connected to lead wires 20 and 22 by a switch means 30. Switch means 30 includes a first movable contact 32 electrically connected to lead wire 20 adapted to selectively engage fixed contacts 34 and 36 and a second movable contact 38 electrically connected to lead wire 22 and adapted to selectively engage fixed contacts 40 and 42. Contacts 36 and 42 are connected to the input of receiver 28 while contacts 34 and 40 are connected to the polarizing source 26. In the positions shown movable contacts 32 and 38 serve to electrically connect the receiver 28 to lead wires 20 and 22. However, by manual or automatic actuation of contacts 32 and 38 into electrical contact with contacts 34 and 40 the source 26 can be directly connected to lead wires 20 and 22 to effect polarization of the transducer disc 14.

In operation of the system depicted in FIGURE 4 when the transducer disc 14 is initially placed below the water surface the movable contacts 32 and 38 are momentarily moved into engagement with contacts 34 and 40 to polarize or to insure polarization of the transducer disc 14. The contacts 32 and 38 are then returned to the positions illustrated in FIGURE 4 to connect the receiver 28 to the transducer.

While there have been described what at present are believed to be the preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

It is claimed and desired to secure by Letters Patent of the United States:

1. A process for piezoelectrically converting electric energy to hydrostatic mechanical energy or vice versa comprising the use of piezoelectric material consisting essentially of a compound having the compositional formula XYZ where X is at least one element selected from the group comprising antimony and bismuth, Y is at least one element selected from the group comprising sulfur, selenium and tellurium and Z is at least one element selected from the group comprising iodine, chlorine and bromine, electrically polarizing the piezoelectric material below the Curie point of the said material, applying to the piezoelectric material energy of one type selected from the class consisting of hydrostatic mechanical energy applied to all faces of said material and electrical energy, and obtaining from the piezoelectric material energy of the other type from the one applied.

2. A process for piezoelectrically converting electric to mechanical hydrostatic energy or vice versa as set forth in claim 1, comprising the use of piezoelectric material comprising the compound SbSI.

3. A process as set forth in claim 1, further characterized in that said piezoelectric material has a *c* axis electrically polarizing said material along said *c* axis, and applying said electric energy to said material along said *c* axis.

4. A process as set forth in claim 1, further characterized by placing said encapsulated piezoelectric material under water, and thereafter electrically polarizing it.

References Cited

UNITED STATES PATENTS

| | | | |
|---|---|---|---|
| 2,490,216 | 12/1949 | Jaffe | 310—9.5 |
| 2,490,236 | 12/1949 | Shaper | 340—10 X |
| 2,741,754 | 4/1956 | Miller | 340—10 |

OTHER REFERENCES

Fatuzzo, E., et al.: Ferroelectricity in SbSI, September 1962, Physical Review, pp. 2036–2037.

Jona et al.; Ferroelectric Crystals, 1962, pp. 10–11.

RODNEY D. BENNETT, *Primary Examiner.*

CHESTER L. JUSTUS, *Examiner.*

R. L. RIBANDO, *Assistant Examiner.*